United States Patent [19]

Hirota et al.

[11] Patent Number: 5,761,788
[45] Date of Patent: Jun. 9, 1998

[54] METHOD FOR MAKING A MAGNETIC HEAD DRUM FOR A MAGNETIC RECORDING APPARATUS

[75] Inventors: Kashichi Hirota; Junji Fukuda, both of Hachioji, Japan

[73] Assignee: Kyowa Electric & Chemical Co., Ltd., Tokyo, Japan

[21] Appl. No.: 707,127

[22] Filed: Sep. 3, 1996

[30] Foreign Application Priority Data

Sep. 19, 1995 [JP] Japan ................................ 7-239929
Dec. 13, 1995 [JP] Japan ................................ 7-324132

[51] Int. Cl.⁶ ................................................ B21B 1/46
[52] U.S. Cl. ................... 29/527.1; 264/267; 264/328.11; 360/107; 360/130.24
[58] Field of Search ...................... 360/107, 130.24; 29/527.1; 264/328.1, 328.11, 267

[56] References Cited

U.S. PATENT DOCUMENTS 3,608,049 9/1971 Tavella ................................ 29/235
5,289,326 2/1994 Matsuwaka et al. .

FOREIGN PATENT DOCUMENTS 2247208 2/1992 United Kingdom .

OTHER PUBLICATIONS

Patent Abstracts of Japan, vol. 12, No. 429 (P-785), 14 Nov. 1988 & JP 63-161558 A (Canon), 5 Jul. 1988—Abstract.

*Primary Examiner*—David P. Bryant
*Attorney, Agent, or Firm*—Frishauf, Holtz, Goodman, Langer & Chick, P.C.

[57] ABSTRACT

A magnetic head drum for a magnetic recording apparatus comprising a metallic ring of a predetermined thickness, and a support body of a plastic material formed in said metallic ring through an outsert forming process. The support body of the plastic material includes a peripheral ring-shaped portion, a central boss portion for receiving a rotating shaft and a web portion connecting the ring-shaped portion with the boss portion. A plurality of magnetic heads are provided on a periphery of the drum to rotate as a unit with the metallic ring. There is also disclosed a method for manufacturing the magnetic head drum through an injection molding process of a plastic material using a metallic ring of a predetermined thickness.

3 Claims, 8 Drawing Sheets

METHOD FOR MAKING A MAGNETIC HEAD DRUM FOR A MAGNETIC RECORDING APPARATUS

BACKGROUND OF THE INVENTION

1. Field of the Invention

The present invention relates to a magnetic head drum for a magnetic recording apparatus such as a video tape recorder. More particularly, the present invention pertains to a magnetic head drum which carries one or more magnetic heads and adapted to rotate with the magnetic heads maintained in contact with a magnetic recording tape.

2. Description of the Prior Art

Current video tape recorders generally adopt a so-called azimuth scanning system wherein a magnetic head drum carrying one or more magnetic heads is mounted with its rotation axis inclined with respect to a feed direction of a magnetic recording tape so that the magnetic tape is fed along a plane inclined with respect to the rotation axis of the drum while being maintained in contact with the peripheral surface of the drum. The magnetic head drum is rotated with a peripheral speed which is higher than the feeding speed of the recording tape. As the result, the magnetic head on the drum is moved on the tape along sequential parallel scanning paths which are inclined with respect to the length of the tape.

In general, the magnetic head drum is supported for rotation by means of a shaft on a stationary drum of a diameter which is the same as that of the magnetic head drum. In order to increase the number of scanning paths, the magnetic head drum is generally provided with two or more magnetic heads located at diametrically opposite positions.

In this type of mechanism, a substantially high friction force is produced between the magnetic head drum and the magnetic recording tape since the peripheral speed of the head rum is higher than the speed of the tape. It should further be noted that the drum must have a certain extent of rotational inertia so that fluctuation in rotating speed of the drum can be suppressed.

In view of the above, it has been a common practice to provide a magnetic head drum for a video tape recorder with a metallic material. In general, a drum of a desired shape is produced by molding an aluminum alloy and thereafter machining on its peripheral surface.

A problem inherent to such conventional magnetic head drum is that it is excessively heavy in weight since it is totally made of a metallic material. It should further be noted that the aluminum alloy casting has to be subjected to a desired machining so that a lot of time and labor are required and the resultant product becomes expensive.

SUMMARY OF THE INVENTION

The present invention is aimed to solve the aforementioned problems encountered in the conventional magnetic head drum and has an object to provide a magnetic head drum which is light in overall weight but possesses a high rotational inertia because of a mass concentrated to a peripheral portion.

Another object of the present invention is to provide a magnetic head drum which is less expensive in manufacture but can satisfactorily suppress fluctuation in rotating speed.

A further object of the present invention is to provide a magnetic head drum which is substantially free from electrostatic charge which may be caused by slipping movements between the magnetic recording tape and the drum surface.

According to the present invention, the above and other objects can be accomplished by a magnetic head drum comprising a metallic ring having a predetermined thickness, and a supporting body of a plastics material provided within the metallic ring by means of an outsert forming. The plastic support body is comprised of a peripheral ring portion connected with the metallic ring for supporting the metallic ring and a central boss portion for receiving a rotation shaft. The magnetic head drum is further provided with at least one magnetic head for rotation with the magnetic head drum as a unit.

In a preferable aspect of the present invention, the magnetic head drum is formed at an outer periphery of the peripheral ring portion of the plastic support body and an inner periphery of the metallic ring with complementarily shaped projections and recesses which are engaged to hold them together so that a relative displacement is prevented between the support body and the metallic ring. In accordance with another aspect of the present invention, the metallic ring is formed at a radially inner peripheral portion of an axial end with a sloped surface which is inclined axially inwardly toward a radially inward direction for providing an increased contact area between the plastic support body and the metallic ring to thereby prevent a relative displacement between the support body and the metallic ring. Further, in another aspect of the present invention, the plastic support body has an axial length which is larger than the axial length of the metallic ring, and the metallic ring and the support body are coplanar in a radial plane at the aforementioned end, whereas at the other end of the metallic ring the support body extends axially beyond the metallic ring and radially beyond the inner periphery of the metallic ring for covering the aforementioned other end of the metallic ring to thereby increase the contact area between the plastic support body and the metallic ring so as to prevent a relative displacement between the support body and the metallic ring.

Preferably, the plastic support body is of a configuration which includes a ring portion adapted to be connected with the inner periphery of the metallic ring and a web portion for connecting the ring portion with the boss portion. In this instance, the ring portion may be partially cut out so that the inner periphery of the metallic ring is partially exposed. The cut out portion or portions thus formed may serve as a relief aperture or apertures for passing a support member or members for supporting the metallic ring in a forming mold during a molding process for forming the plastic support body. Further, in accordance with the present invention, it is preferable that the plastic support body is made of an electrically conductive plastics material for preventing electrostatic charges which may otherwise be produced due to sliding movements between the magnetic recording tape and the magnetic head drum.

The present invention further provides a method for manufacturing a magnetic head drum for a magnetic recording apparatus. The method uses a forming mold comprising a transverse slide core divided into a plurality of core pieces and defines in a closed position a recess which is adapted to be placed in an intimate contact with the outer periphery of a metallic ring, a male die having a cylindrical land of a diameter smaller than the internal diameter of the metallic ring, the land being formed at an outer periphery with one or more projections for contact with the inner surface of the metallic ring, the land being further formed at an end surface with a recess for forming a bearing boss portion of the support body, and a female die having an inner surface adapted to be placed to be opposed to the end surface of the male die with a spacing thereto. The method comprises steps of locating the metallic ring so that the metallic ring is held between the slide core and the projection on the land of the male die, closing the mold to provide a forming cavity between the inner surface of the metallic ring and the land of the male die, between the end surface of the land of the male die and the inner surface of the female die, and the bearing boss portion forming recess on the end surface of the land of the male die, and injecting molten plastics material into the forming cavity and solidifying the material to produce a magnetic head drum of a structure having a metallic ring with a support body integrally connected thereto.

According to a preferable aspect of the present invention, the method for producing a magnetic head drum further comprises subjecting the outer surface of the metallic ring which has a plastic support body formed integrally thereon through the outsert process to a grinding process to provide a further improved accuracy, particularly an improved concentricity. The grinding process in this instance may be carried out with reference to the rotating shaft of the support body.

It is also preferable to form a plurality of shallow circumferential grooves on the metallic ring to provide air grooves which may be effective to prevent the tape from being adhered to the drum. The circumferential grooves may be formed simultaneously when the grinding process is being carried out.

The magnetic head drum in accordance with the present invention has a metallic ring at the peripheral portion whereas the support body is made of a plastic material. It is therefore possible to provide portions such as mounts for attachment to a drum support mechanism which require complicated shaping with molding of plastic material so that it is possible to decrease the necessity of subsequent work such as a machining in a later stage. Thus, expenses for machining can therefore be decreased in general. It should further be noted that although the support body is made of a light weight plastics material, substantial mass is concentrated at the peripheral portion because of the peripheral portion formed by the ring of a metallic material, so that a high rotative inertia can be maintained. The magnetic head drum has a peripheral portion for sliding contact with the magnetic tape, however, such peripheral portion is made of the metallic ring so that a sufficient frictional resistance can be ensured.

It may be possible that electrostatic charge may be produced due to sliding movements between the magnetic recording tape and the surface of the magnetic head drum, however, it is possible to have the charge dissipated through the metallic ring. If it is not sufficient for the metallic ring to discharge the electrostatic charge, the plastic support body may be formed from an electrically conductive plastics material.

BRIEF DESCRIPTION OF THE DRAWINGS

FIG. 4 (b) is a side elevational view of the drum;

FIG. 8 (b) is a vertical sectional view of the mold in the open position;

DESCRIPTION OF THE PREFERRED EMBODIMENT

Figure 1:
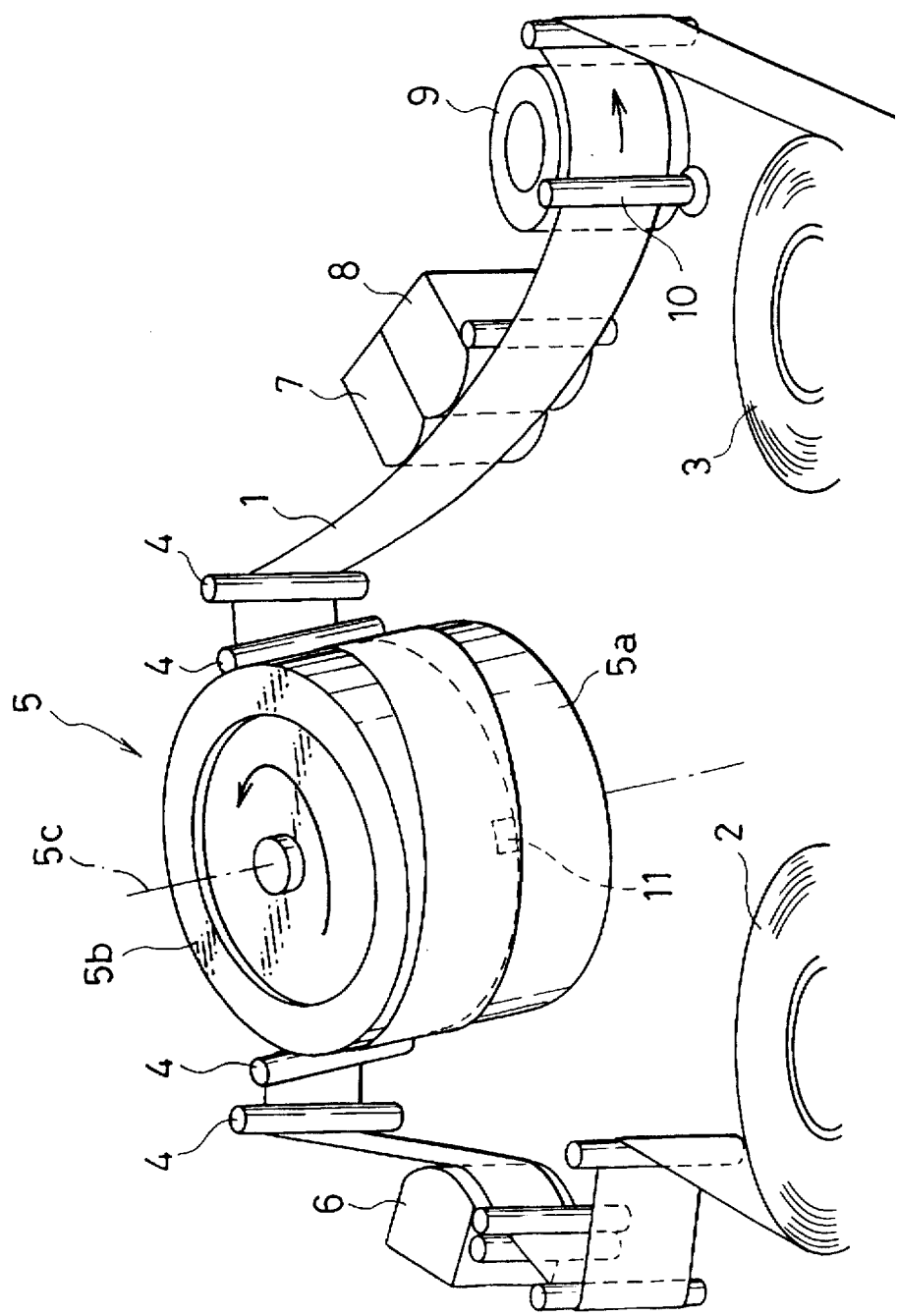
FIG. 1 is a perspective view of a tape driving mechanism for a video tape recorder having a magnetic head drum to which the present invention can be applied.

Referring to the drawings, particularly to FIG. 1, there is shown in an operative condition an example of a magnetic head drum to which the present invention can be applied. A magnetic recording tape 1 is shown as being passed between a supply reel 2 and a take up reel 3 which are located in a cassette. The tape 1 is drawn from the cassette by means of a plurality of guide post 4 and passed around a magnetic head drum assembly 5. In FIG. 1, the numeral 6 designates a full width erasing head, 7 a sound head and 8 a control head. The magnetic recording tape 1 is driven in the direction shown by an arrow by being held between a pinch roller 9 and a capstan 10.

The magnetic head drum assembly 5 includes a lower stationary 15 drum 5a which is maintained stationary, and an upper rotatable drum or a magnetic head drum 5b which is supported rotatably on the lower stationary drum 5a. The upper rotatable drum or magnetic head drum 5b has an outer periphery on which a plurality of magnetic heads 11 are carried at circumferentially spaced positions. As well known in the art of video tape recorder technology, the magnetic head drum assembly 5 has a rotating axis 5c which is inclined with respect to a plane along which the magnetic recording tape 1 is advanced. The magnetic recording tape 1 is forced by means of a guide post 4 toward the drum assembly 5 so that it is brought into a skew contact with the surface of the drum 5. The upper rotatable drum 5b is rotationary driven in the direction of the arrow at a peripheral speed higher than the advance speed of the tape 1. As the result, slanted stripes of recording bands are produced on the magnetic recording tape 1.

Figure 2:
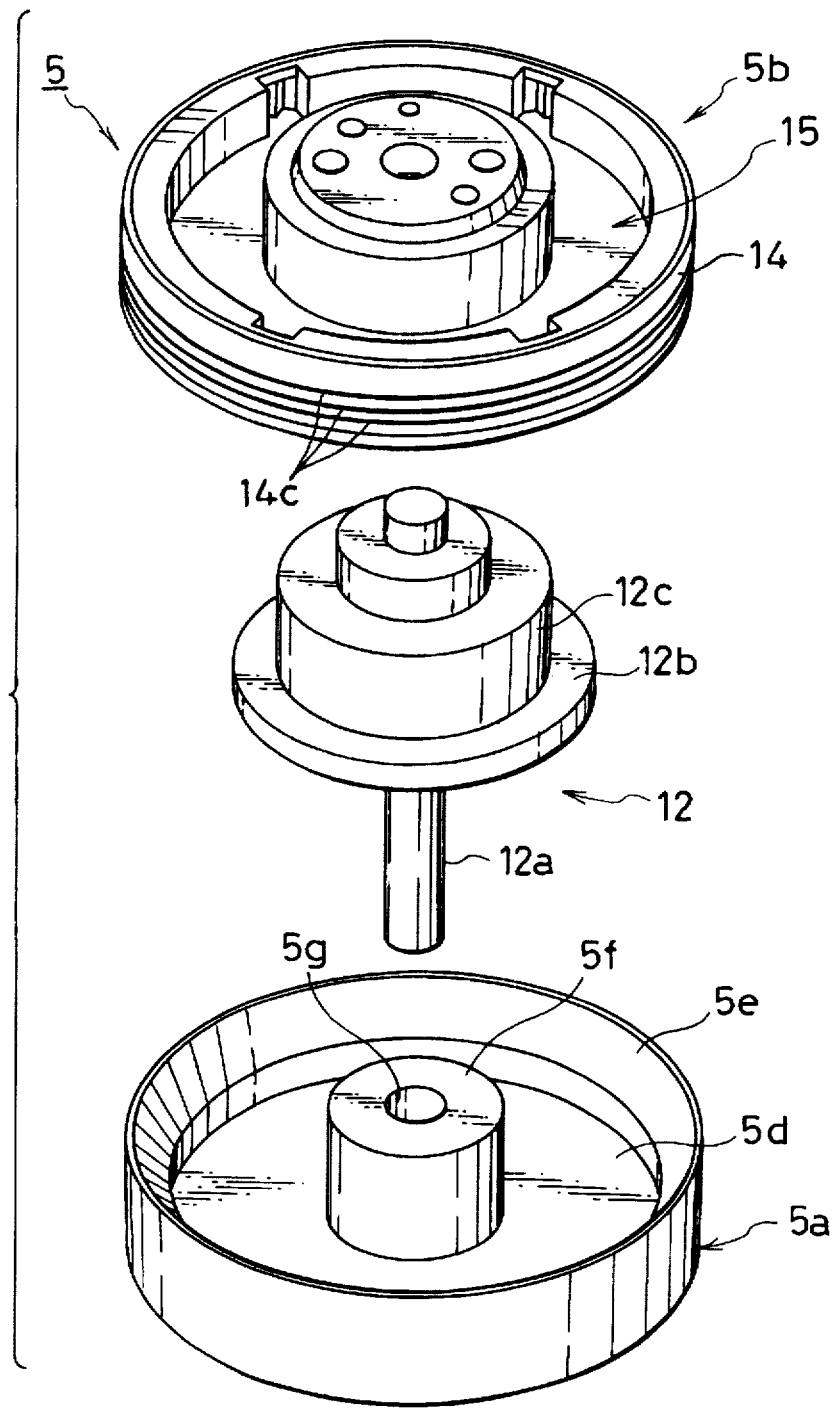
FIG. 2 is a perspective view showing a magnetic head drum and a stationary drum.

In the magnetic recording apparatus as shown, the present invention is applied to the upper rotatable or magnetic head drum 5b. Referring to FIG. 2, it will be noted that the lower stationary drum 5a comprises a planar bottom portion 5d, a ring-shaped flange 5e extending upwardly from the periphery of the bottom portion 5d, and a bearing boss 5f extending upwardly from the center of the bottom portion 5d. The magnetic head drum 5b is mounted on the upper end portion of a support shaft 12 which has a stem portion 12a received rotatably by an axial bore 5g formed in the center of the bearing boss 5f of the lower stationary drum 5a.

Figure 3:
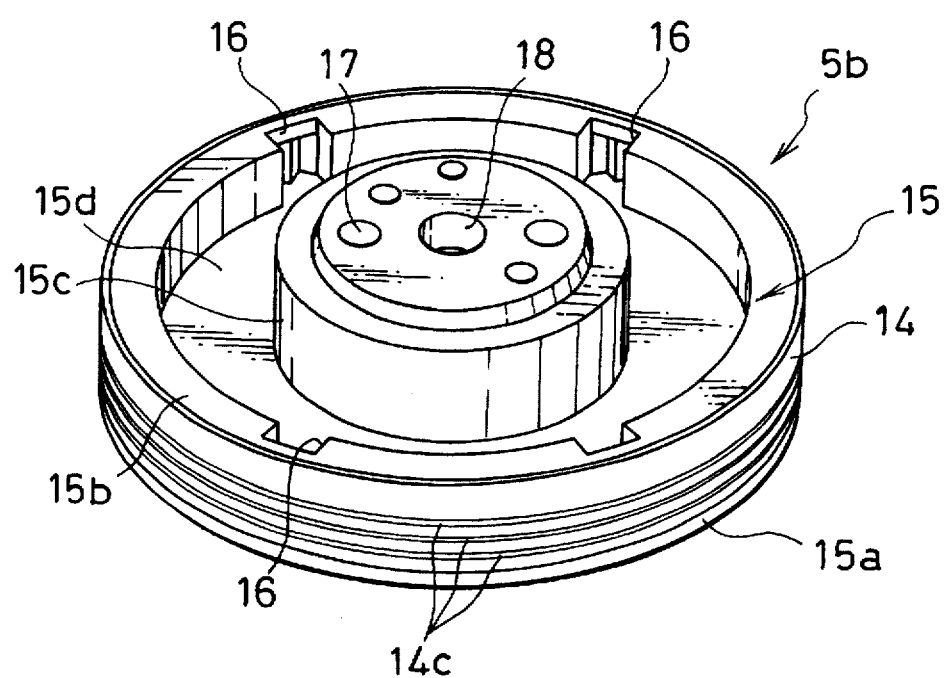
FIG. 3 is a perspective view of a magnetic head drum in accordance with one embodiment of the present invention.
Figure 4A:
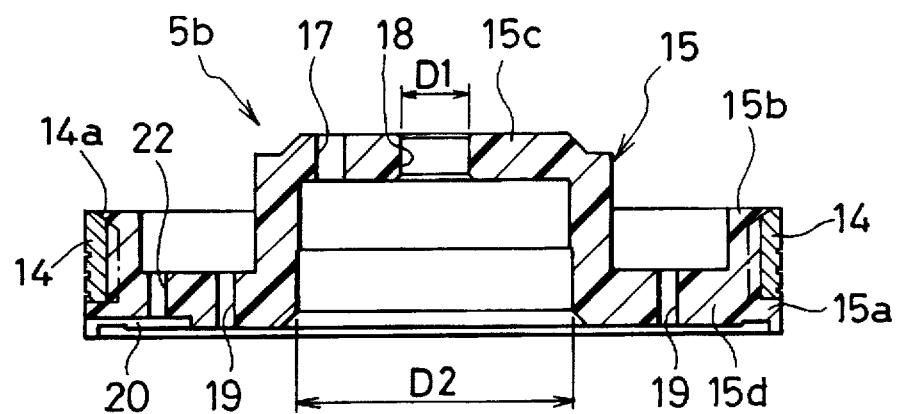
FIG. 4 (a) is a sectional view of the magnetic head drum shown in FIG. 3.
Figure 4B:
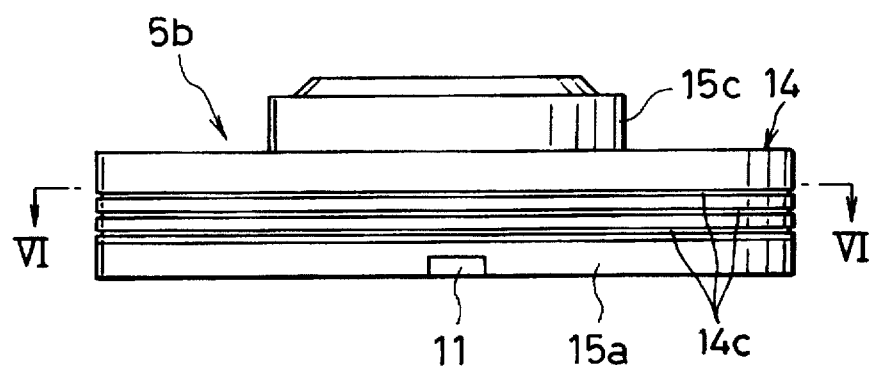

FIGS. 3 to 7 show structures of the magnetic head drum 5b. As shown in FIG. 3, the magnetic head drum 5b comprises a metallic ring 14 which is made of a suitable metallic material such as an aluminum alloy, and a support body 15 formed in the interior of the metallic ring 14 by means of an injection molding of a plastic material. As shown in FIGS. 4 (a) and 5, the metallic ring 14 has an axial length l which is smaller than the axial length L of the support body 15 and the upper end surface of the metallic ring 14 is coplanar with the upper end surface of the support body 15. The other end of the support body 15 extends axially beyond the other end of the metallic ring 14 to provide an axial extension 15a which also extends radially outwardly to cover the lower end surface of the metallic ring 14.

Figure 5:
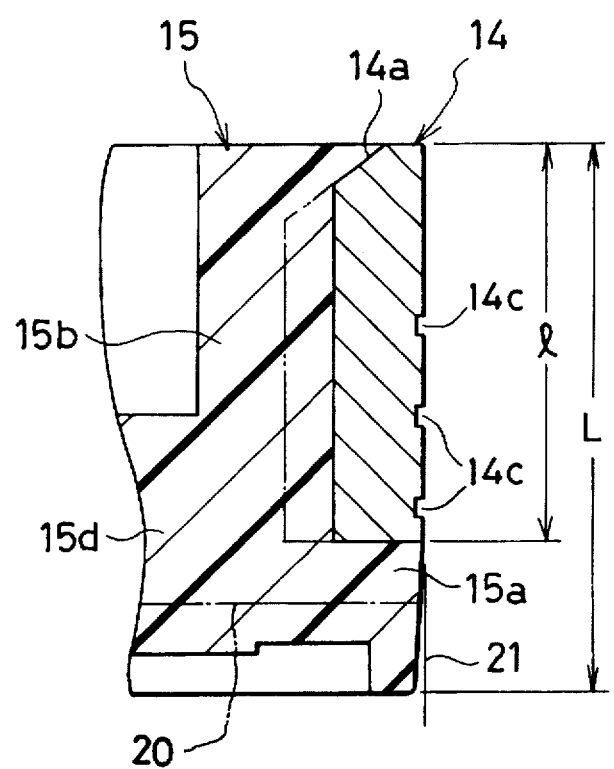
FIG. 5 is fragmentary sectional view in an enlarged scale of the magnetic head drum.
Figure 6:
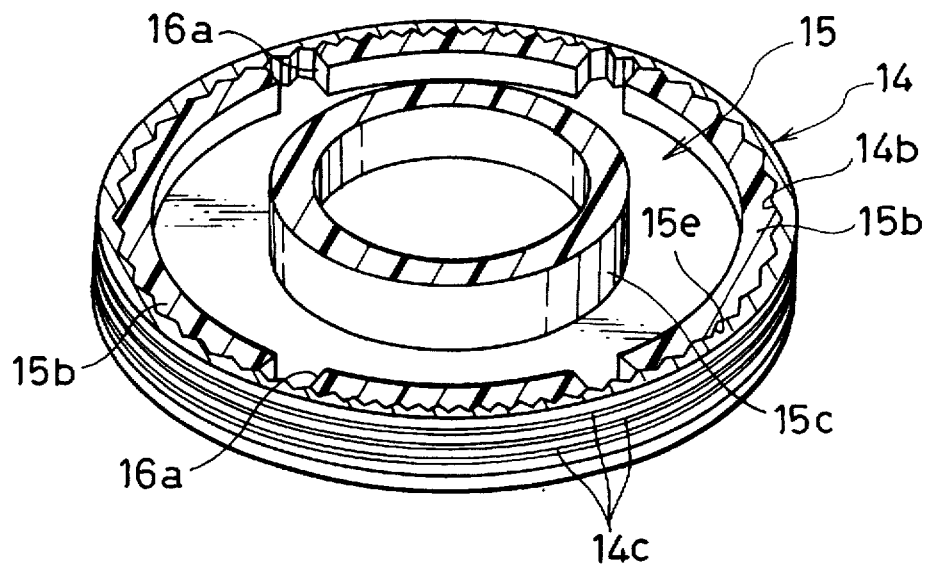
FIG. 6 is a perspective view showing a section at the line VI—VI in FIG. 4 (b)

The support body 15 made of a plastic material includes a peripheral ring-shaped portion or an upright flange portion 15b which is connected with the inner surface of the metallic ring 14, and a hollow cylindrical central boss portion 15c adapted to be connected with the upper end portion of the support shaft 12, a web portion 15d being formed to connect together the flange portion 15b and the central boss portion 15c. Referring to FIG. 5, it will be noted that the metallic ring 14 is formed at an inner peripheral portion of the upper end surface with an inwardly inclined slanted surface 14a which is covered by the plastic support body 15. Further, as shown in FIG. 6, the metallic ring 14 is formed throughout the inner peripheral surface with a serrated pattern 14b. Similarly, the flange portion 15b of the support body 15 is formed on the outer surface with a serrated pattern 15e of a configuration complementary to the serrated pattern 14b on the metallic ring 14. The serrated patterns 14b and 15e are engaged with each other.

The connection between the metallic ring 14 and the support body 15 is ensured by the contact between the slanted surface 14a on the upper end of the metallic ring 14 and the plastic material of the support body 15, the engagement between the aforementioned serrated patterns 14b and 15e and the contact between the lower end surface of the metallic ring 14 and the radially outward extension 15a of the support body 15, so that it is possible to eliminate any possibility of relative displacement between the metallic ring 14 and the support body 15 under a frictional force which may be produced during operation. It may be possible to omit one or both of the slanted surface 14a at the upper end of the metallic ring 14 and the engagement at the serrated patterns 14b and 15e depending on the contact pressure under which the magnetic recording tape is maintained in contact with the magnetic head drum 5b. The radially outward extension 15a formed on the lower portion of the support body 15 provides an additional advantage as will be described later.

Referring to FIG. 3, it will be noted that the upright flange 15b of the plastic support body 15 is formed at peripherally spaced positions with cutouts 16. The material of the root portion of the upright flange 15b is completely removed at the locations of the cutouts 16 to provide cutout recesses 16a as shown in FIG. 6. The inner surface of the metallic ring 14 is exposed at the locations of the cutout recesses 16a. The central boss portion 15c of the support body 15 is formed at the upper end surface with a plurality of bolt holes 17 which are adapted to be used for attaching motor or its parts for rotationary driving the magnetic head drum 5b. The central boss portion 15c of the support body 15 is formed at its center with a bore 18 for fitting the stem portion 12a of the support shaft 12.

Figure 7:
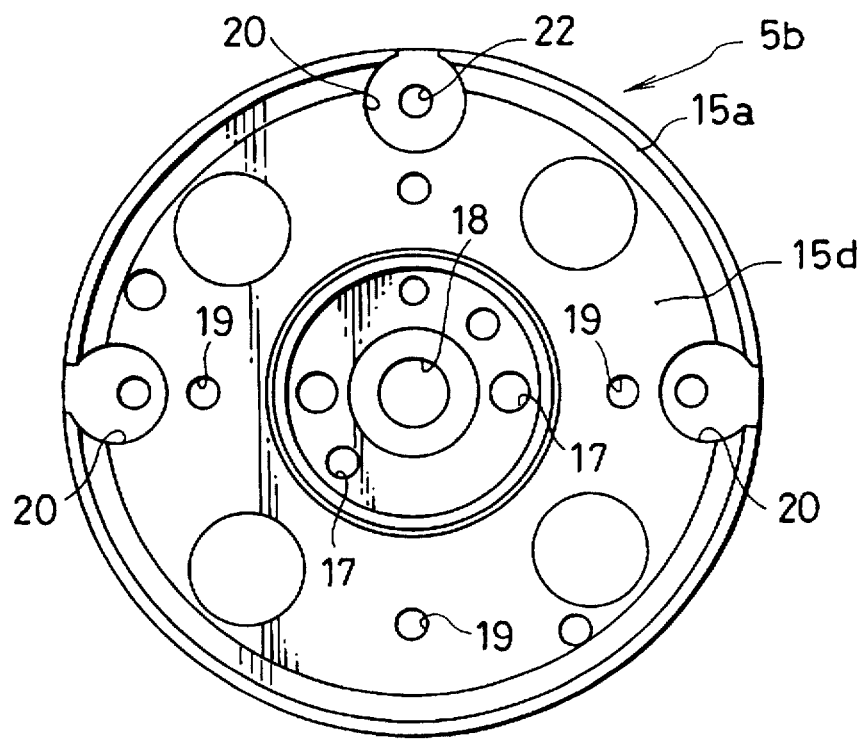
FIG. 7 is a bottom view of the magnetic head drum.

FIG. 7 shows the lower surface of the magnetic head drum 5b. Referring simultaneously to FIG. 4 (a), the extension 15a of the support body 15 has a peripheral annular portion projecting downwardly and the web portion 15d has a planar bottom surface slightly offset upwardly from the downwardly projecting portion. The bottom surface of the web portion 15d is received by an annular flange 12b formed on the support shaft 12. The central boss portion 15c of the support body 15 has an internal cylindrical cavity to which a cylindrical land 12c of the support shaft 12 is fitted. The web portion 15d of the support body 15 is formed at circumferentially spaced positions with a plurality of screw threaded holes 19 for receiving screws for attaching the support body 15 to the annular flange 12b.

The plastic support body 15 is formed with magnetic head mounting recesses 20 which extend form the bottom surface of the web portion 15d to the bottom surface of the extended portion 15a. The recesses 20 are opened to the outer periphery of the extended portion 15a. It will be noted in FIG. 5 that the outer periphery of the extended portion 15a has an upper end which is on the same radial position as the outer periphery of the metallic ring 14 and is slightly inclined downwardly toward radially inward direction. The outer periphery of the stationary drum 5a which is located beneath the magnetic head drum 5b is on the same radial position as the outer periphery of the metallic ring 14 of the magnetic head drum 5b. It will therefore be understood that the outer periphery of the extended portion 15a of the plastic support body 15 is offset radially inwardly with respect to the outer periphery of the metallic ring 14 of the magnetic head drum 5b and the outer periphery of the stationary drum 5a. The arrangement is effective to maintain the extended portion 15a of the plastic support body 15 out of contact with the magnetic recording tape 1.

The magnetic head is mounted on the support body 15 in such a manner that the magnetic gap is located on the downward extension 21 of the outer periphery of the metallic ring 14. In FIG. 5, the recess 20 for mounting the magnetic head is shown by a phantom line. As shown in FIG. 4(a), the support body 15 is formed at the web portion 15d with magnetic head mounting screw holes 22 which extend to the magnetic head mounting recesses 20.

As described, the support body has a complicated configuration and besides is has to be provided with various recesses and apertures. Conventionally, a magnetic head drum has been manufactured from a block of an aluminum alloy through machining processes such as cutting. In accordance with the aforementioned embodiment of the present invention, portions which is complicated in configuration and require various apertures are all provided by an injection molding of a plastic material. It will therefore be appreciated that the necessity of machining is reduced and the manufacturing cost can be substantially decreased. A magnetic head is generally formed at its periphery with a plurality of shallow peripheral grooves 14c for providing a layer of air which may prevent the magnetic recording tape from being stuck on the head. It should be noted that in accordance with the present invention such grooves can be readily formed on the metallic ring. The grooves may be formed on the metallic ring before it is mounted on the plastic support body 15 but alternatively it may be formed after the outsert process has been carried out.

The outer peripheral portion of the metallic ring may be machined after it has been mounted integrally by the outsert forming process taking the support shaft as the reference. This will provide an increased accuracy, particularly in respect of concentricity.

Figure 8A:
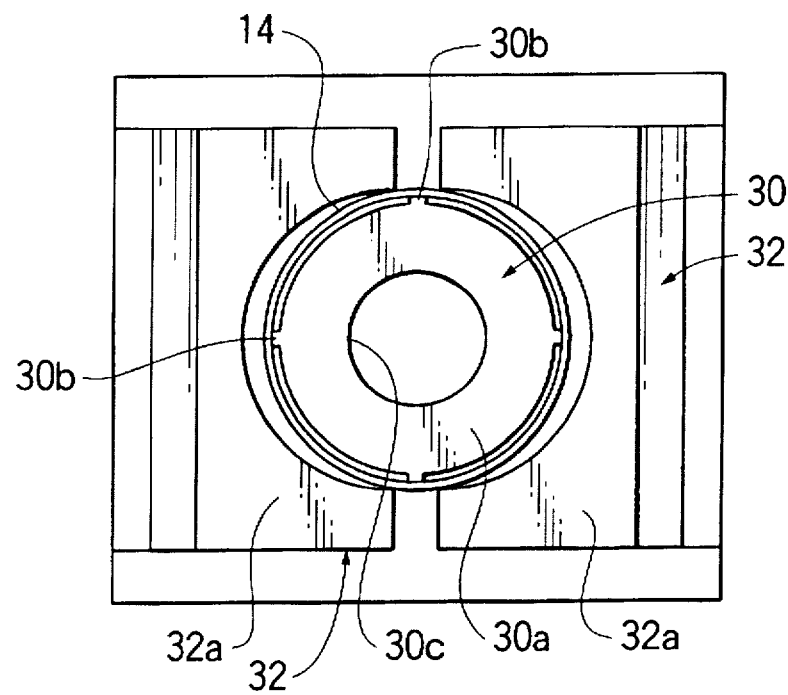
FIG. 8 (a) is a horizontal sectional view of a mold for producing the magnetic head drum, the mold being shown in an open position.
Figure 8B:
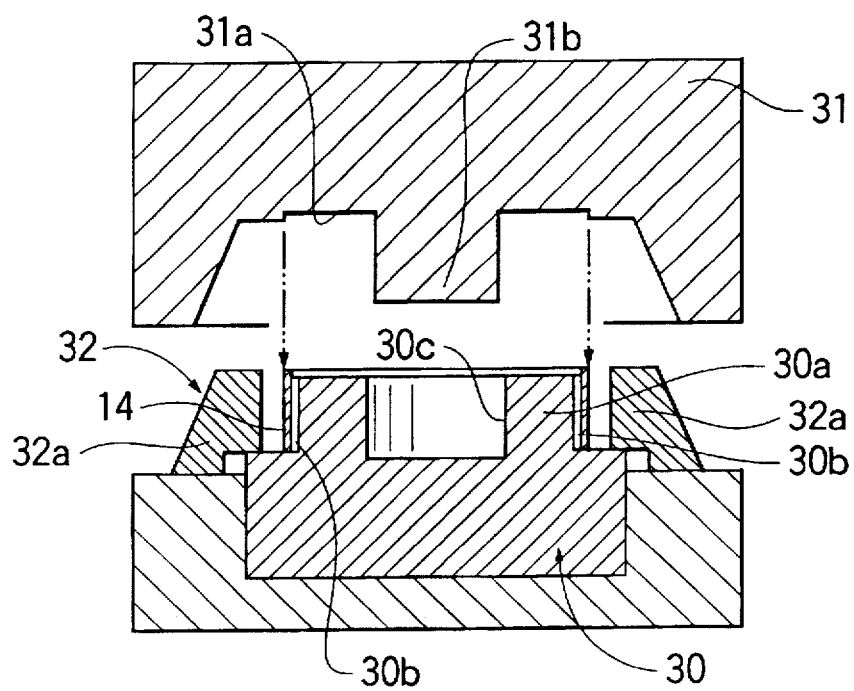
Figure 9A:
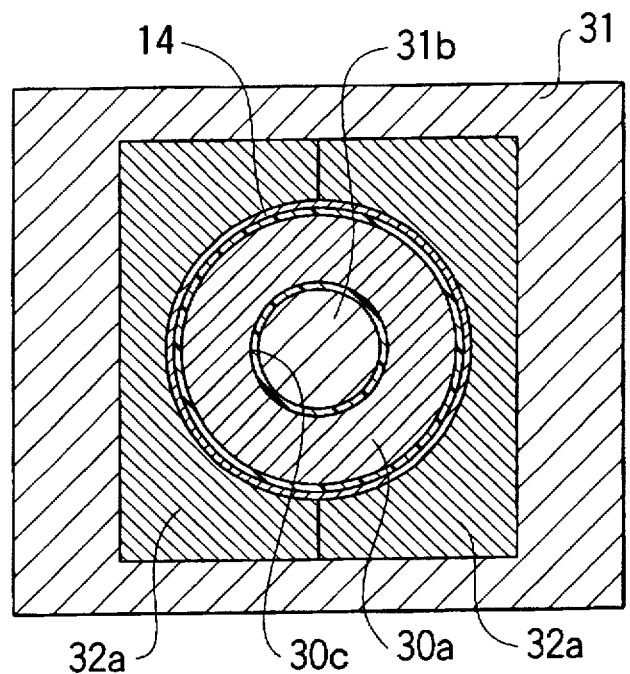
FIG. 9 (a) is a horizontal sectional view of the mold in a closed position; and, FIG. 9 (b) is a vertical sectional view of the mold in the closed position.
Figure 9B:
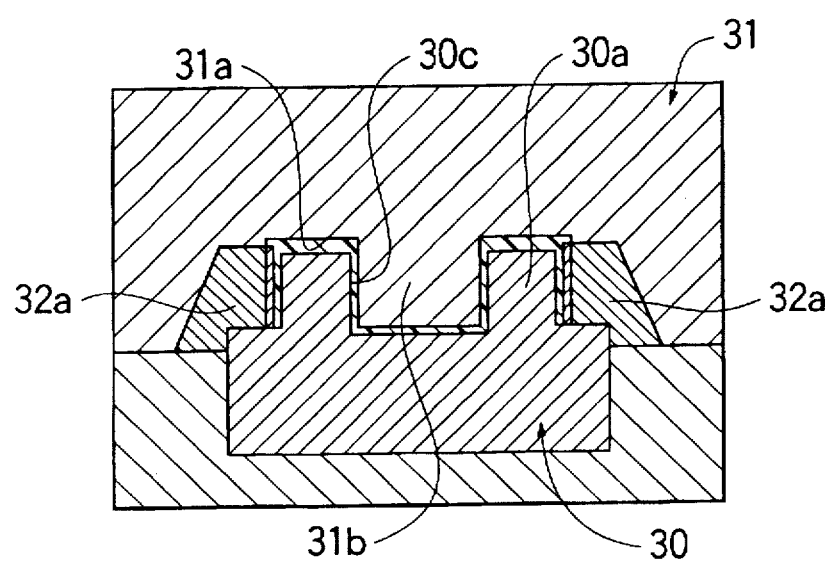

FIGS. 8 and 9 show an example of the method for manufacturing a magnetic head drum in accordance with the present invention. In FIGS. 8(a) and (b), there are shown in horizontal and vertical sections a mold in an open position. The mold comprises a lower male die 30, an upper female die 31 and a transversely slidable slide core 32. In the illustrated embodiment, the slide core is divided into two core pieces 32a. The male core 30 includes a centrally located cylindrical core 30a which is formed with projections 30b formed at 90° circumferential distances to project in radially outward direction. The projections 30b are of configurations which are complementary to the configurations of the cutouts 16 and 16a on the support body 15 of the magnetic head drum 5b.

The male die 30 has a recess 30c which is of a configuration complementary to the outer configuration of the central boss portion 15c of the support body 15 of the magnetic head drum 5b. The female die 31 includes a bottom surface 31a complementary in configuration to the bottom surface of the magnetic head drum 5b and a core 31b which is adapted to be inserted into the recess 30c formed in the core 30a of the male die 30. The core 31b of the female die 31 cooperate with the recess 30c formed in the core 30a of the male die 30 to provide a mold cavity for forming the boss portion 15c of the magnetic head drum 5b.

The metallic ring 14 for forming the magnetic head drum 5a is fitted to the core 30a of the male die 30 as shown in FIG. 8(a). In this instance, the projections 30b of the core 30a are maintained in contact with the inner periphery of the metallic ring 14 to thereby support the metallic ring 14. In this position, the metallic ring 14 and the core 30a define therebetween a cavity for forming the upright flange 15b of the support body 15. The mold is then closed as shown in FIGS. 9(a) and (b) and molten plastic is injected into the mold cavity formed in the mold. After the injected plastic material is solidified, the molded product is taken out of the mold to obtain a desired magnetic head drum.

In order to increase the accuracy, particularly the concentricity of the outer periphery of the magnetic head drum, the metallic ring 14 which is made integral with the support body 15 through the outsert forming process is subjected at the outer peripheral portion to a grinding operation. In the grinding operation, the shaft mating portion for fitting the support shaft 12, that is, the inner diameter D1 of the mating hole 18 in the support body 15 and the inner diameter D2 of the cylindrical recess of the central boss portion 15c are taken as the reference. The amount of grinding may preferably be 0.1 to 0.05 mm.

Conventionally, a magnetic head drum of this type is formed at the outer peripheral surface with air grooves for providing an air layer between the drum outer surface and the magnetic recording tape so as to prevent the tape from being stuck to the drum surface. In accordance with the present invention, it is preferable that such air grooves be formed by providing the outer periphery of the metallic ring with a plurality of shallow peripheral grooves 14c. The peripheral grooves may be formed simultaneously with the grinding process on the outer peripheral surface of the metallic ring.

In accordance with the present invention, the magnetic head drum for use with a magnetic recording apparatus is constituted by a peripheral portion made of a metallic ring and an inner support body made of a plastic material, so that it is possible to reduce the necessity of machining operation and decrease the manufacturing cost. It should further be noted that since the peripheral portion is made of a metallic ring, it is possible to eliminate the problem of wear due to the contact with the tape. Since the rotational inertia can be sufficiently provided, there will be no risk of rotational fluctuations caused by the use of a plastic material.

The invention has thus been shown and described with reference to a specific structure, however, it should be noted that the invention is in no way limited to the details of the illustrated structures but changes and modifications may be made within the scope of the appended claims.

We claim:

1. A method for manufacturing a magnetic head drum comprising the steps of:

providing a forming mold including a transversely slidable sliding core divided into a plurality of core pieces and adapted to define in a closed position a cavity having an inner periphery in intimate contact with an outer periphery of a metallic ring, a male die having a cylindrical land which is smaller in diameter than an inner periphery of the metallic ring and at least one projection formed on an outer surface of said and for contact with the inner periphery of the metallic ring, said land having an end surface formed with a recess for forming a bearing boss portion, and a female die having an inner surface which is adapted to be held against said end surface of the land on said male die;

holding the metallic ring between said sliding core and said at least one projection of said land of the male die;

closing said female die against the male die, to cause the sliding core to transversely slide toward the metallic ring and into intimate contact with the outer Periphery thereof, and to form a molding cavity between the inner periphery of the metallic ring and said land of said male die, between said end surface of said projection of the male die and the inner surface of said female die, and by said recess for forming the bearing boss portion; and injecting molten plastic material into said molding cavity, and solidifying the plastic material to obtain a magnetic head drum having a support body of plastic material integrally connected with the metallic ring.

2. A method for manufacturing a magnetic head drum in accordance with claim 1 which further includes a step of grinding the outer periphery of the metallic ring after the metallic ring is integrally connected with the support body, taking the rotating axis of the support body as a reference so as to obtain an improved concentricity of the outer periphery of the metallic ring.

3. A method for manufacturing a magnetic head drum in accordance with claim 1 which further includes a step of forming shallow peripheral grooves in the outer periphery of the metallic ring after the metallic ring is integrally connected with the support body for providing air grooves for preventing sticking of a magnetic tape.

* * * * *